(12) United States Patent
Wickham et al.

(10) Patent No.: US 7,546,595 B1
(45) Date of Patent: Jun. 9, 2009

(54) SYSTEM AND METHOD OF INSTALLING SOFTWARE UPDATES IN A COMPUTER NETWORKING ENVIRONMENT

(75) Inventors: Robert T Wickham, Sammamish, WA (US); Vinay Deo, Redmond, WA (US); Adrian Arkadiusz Maziak, Sammamish, WA (US); Mel MacMahon, Kirkland, WA (US); Bruce W Copeland, Redmond, WA (US); Shafqat U Khan, Redmond, WA (US); Adam D Welker, Kirkland, WA (US); Khuzaima Iqbal, Bellevue, WA (US); Yasser Mufti, Seattle, WA (US); Bippen Bisht, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 447 days.

(21) Appl. No.: 10/966,621

(22) Filed: Oct. 14, 2004

(51) Int. Cl.
    G06F 9/44 (2006.01)
    G06F 9/445 (2006.01)

(52) U.S. Cl. .................................. 717/168; 717/174

(58) Field of Classification Search ......... 717/168–178; 709/213–219, 225–232
    See application file for complete search history.

(56) References Cited

U.S. PATENT DOCUMENTS

| | | | | |
|---|---|---|---|---|
| 4,860,251 A * | 8/1989 | Bizjak et al. | ................. | 345/556 |
| 5,896,566 A * | 4/1999 | Averbuch et al. | ............. | 455/419 |
| 6,031,830 A * | 2/2000 | Cowan | ........................ | 370/338 |
| 6,047,129 A * | 4/2000 | Frye | ........................... | 717/172 |
| 6,074,434 A * | 6/2000 | Cole et al. | ................... | 717/173 |
| 6,199,204 B1 | 3/2001 | Donohue | | |
| 6,374,335 B1 * | 4/2002 | Barthel et al. | ............... | 711/162 |
| 6,763,403 B2 * | 7/2004 | Cheng et al. | ................... | 710/36 |
| 7,165,250 B2 * | 1/2007 | Lyons | ........................ | 717/177 |
| 7,210,143 B2 * | 4/2007 | Or et al. | ..................... | 717/174 |
| 7,353,511 B1 * | 4/2008 | Ziese | .......................... | 717/178 |
| 2002/0174422 A1 * | 11/2002 | Kelley et al. | ................ | 717/178 |
| 2003/0046676 A1 * | 3/2003 | Cheng et al. | ................ | 717/173 |
| 2003/0097427 A1 * | 5/2003 | Parry | .......................... | 709/220 |
| 2003/0186689 A1 * | 10/2003 | Herle et al. | ................. | 455/418 |
| 2003/0200397 A1 * | 10/2003 | McAllister et al. | .......... | 711/141 |
| 2004/0168165 A1 * | 8/2004 | Kokkinen | ................... | 717/168 |
| 2004/0205154 A1 * | 10/2004 | Dalton et al. | ............... | 709/217 |
| 2005/0071839 A1 * | 3/2005 | Kim et al. | .................... | 717/170 |
| 2005/0091397 A1 * | 4/2005 | Roberts et al. | .............. | 709/232 |
| 2005/0144616 A1 * | 6/2005 | Hammond et al. | .......... | 717/173 |

(Continued)

OTHER PUBLICATIONS

Anzbock et al. "Software configuration, distribution, and Deployment of Web-Services", Jul. 2002, ACM, SEKE '02, pp. 649-656.*

(Continued)

*Primary Examiner*—Wei Y Zhen
*Assistant Examiner*—Anna Deng
(74) *Attorney, Agent, or Firm*—Workman Nydegger (57) ABSTRACT

The present invention provides a system and method of installing software updates to computing devices connected to an enterprise network. More specifically, the present invention provides a system and method of installing software updates based on input received from a system administrator or similar entity. When a command to install a software update is received, the present invention obtains the requested software update from a download center and causes the software update to be transmitted to client computing devices that need the functionality provided by the software update. Then the software update is installed in accordance with the input previously obtained from the system administrator.

16 Claims, 8 Drawing Sheets

U.S. PATENT DOCUMENTS

2005/0273779 A1* 12/2005 Cheng et al. ............... 717/168
2006/0020938 A1* 1/2006 Elcock et al. ............... 717/178
2006/0075001 A1* 4/2006 Canning et al. ............. 707/203

OTHER PUBLICATIONS

Phan et al. "Middleware support for recociling client updates and data transcoding", Jun. 2004, ACM, MobiSys '04, pp. 139-152.*

Badhusha, A., et al., "Automatic Signature Files Update in Antivirus Software Using Active Packets," *Proceedings of the ACS/IEEE International Conference on Computer Systems and Applications*, Beirut, Lebanon, Jun. 25-29, 2001, pp. 457-460.

Beers, C.T., "McAfee Shores Up Your Defenses: ePolicy Orchestrator 3.0 Manages Multiple Security Tools," *Network Computing* 14(12):38-40, Jun. 26, 2003.

Fletcher, M., "doit: A Network Software Management Tool," *Proceedings of the Sixth Systems Administration Conference *LISA VI)*, USENIX Association, Long Beach, California, Oct. 19-23, 1992, pp. 189-196.

Izal, M., et al., "Dissecting BitTorrent: Five Months in a Torrent's Lifetime," *Proceedings of PAM 2004, Lecture Notes in Computer Science 3015*:1-11, Antibes Juan-les-Pins, France, Apr. 19-20, 2004.

Lockard, J., and J. Larke, "Synctree for Single Point Installation, Upgrades, and OS Patches," *Proceedings of the Twelfth Systems Administration Conference (LISA XII)*, Boston, Dec. 6-11, 1998, pp. 261-270.

Noll, J., and W. Scacchi, "Supporting Software Development in Virtual Enterprises," *Journal of Digital Information* 1(4):142-160, Jan. 14, 1999.

* cited by examiner

| SOFTWARE UPDATE ID | SOFTWARE INSTALLED BY UPDATE SERVER | SYSTEMS UPDATED BY EXTERNAL MEANS | TOTAL SYSTEMS UPDATED | SYSTEMS NOT REQUIRING THE UPDATE | COMPLIANT SYSTEMS |
|---|---|---|---|---|---|
| MS03-029 | 500, 10% | 250, 5% | 750, 15% | 1000, 20% | 1750, 35% |
| MS03-030 | 250, 5% | 0, 0% | 250, 5% | 500, 10% | 750, 15% |
| MS03-031 | 4990, 99% | 0, 0% | 4990, 99% | 0, 0% | 4990, 99% |
| MS03-032 | 0, 0% | 2500, 50% | 2500, 50% | 0, 0% | 2500, 50% |
| MS03-033 | 500, 10% | 100, 2% | 600, 12% | 400, 8% | 1000, 20% |
| MS03-034 | 1000, 20% | 200, 4% | 1200, 24% | 100, 2% | 1300, 26% |

*Fig. 4.*

| SOFTWARE UPDATE ID | PRELIMINARY SUCCESS | INSTALL VERIFIED | INSTALL FAILED | NO STATUS |
|---|---|---|---|---|
| MS03-029 | 400, 8% | 100, 2% | 100, 1% | 4400, 89% |

DESCRIPTION: MS03-029 DISINFECTS COMPUTING DEVICES INFECTED WITH THE "SO-BIG" VIRUS.

MORE INFORMATION

| MS03-035 |
|---|

| TIME PERIOD | INSTALLED BY UPDATE SERVER | | INSTALLED BY EXTERNAL MEANS | | SYSTEMS NOT REQUIRING THE UPDATE | | COMPLIANT SYSTEMS | |
|---|---|---|---|---|---|---|---|---|
| 1 | 10, | 1% | 0, | 0% | 10, | 1% | 20, | 2% |
| 2 | 50, | 5% | 10, | 1% | 20, | 2% | 80, | 8% |
| 3 | 100, | 10% | 30, | 3% | 50, | 5% | 180, | 18% |
| 4 | 200, | 20% | 50, | 5% | 50, | 5% | 300, | 30% |
| 5 | 350, | 35% | 60, | 6% | 50, | 5% | 460, | 46% |
| 6 | 500, | 50% | 70, | 7% | 50, | 5% | 620, | 62% |

*MS03-035*

| COMPUTER NAME | USER DOMAIN | LAST STATUS MESSAGE | LAST STATUS TIME |
|---|---|---|---|
| A3709 | REDMOND | REBOOT PENDING | 14:00 10/31/04 |
| A4000 | ISSAQUAH | INSTALLED SUCCESSFULLY | 14:26 10/31/04 |
| A4001 | PORTLAND | INSTALLATION FAILURE | 8:00 11/01/04 |
| A4002 | REDMOND | INSTALLED SUCCESSFULLY | 9:02 11/01/04 |
| A4003 | REDMOND | INSTALLED SUCCESSFULLY | 10:04 11/01/04 |
| A4004 | ISSAQUAH | REBOOT PENDING | 13:55 11/02/04 |

SYSTEM AND METHOD OF INSTALLING SOFTWARE UPDATES IN A COMPUTER NETWORKING ENVIRONMENT

FIELD OF THE INVENTION

The present invention relates to computer programs and, more specifically, to computer programs that improve distribution and installation of software updates over computer networks.

BACKGROUND OF THE INVENTION

Explosive growth in computer networks in the last two decades has changed the uses of computers dramatically. The largest computer network, commonly known as the Internet or World Wide Web ("WWW"), is now connecting millions of computing devices in the world, providing services like e-mail, file transfer, and hypermedia information retrieval across different computer platforms. Increasingly, organizations such as companies, educational institutions, service providers and the like depend on networks that operate inside an organization (hereinafter referred to as an "enterprise network") and also connect to external networks such as the Internet. With the rapid growth of computer network technology, the management of software that executes in a networking environment has gained in importance. For example, as additional computing devices are interconnected through various networks, computing device security in the form of antivirus software has become increasingly important.

A large number of application programs and files used by computing devices need periodic updates. Many updates are of vital importance, such as those updates that involve antivirus software. Recently, network-based systems have been developed that distribute software updates as a download over a computer network such as the Internet. For example, U.S. Pat. No. 6,199,204, to Donohue et al., describes a system that provides software updates from a Web site. The software updates may be automatically installed based on the perceived needs of a computing device or the software updates may be installed manually based on input received from a user.

Installing and maintaining software in an enterprise network environment is a major cost to organizations. This is particularly the case where a large number of networked computing devices are involved, each computing device having a large number of application programs and possible software updates. As the number of computing devices in an enterprise network increases, it becomes progressively more difficult to maintain each computing device in a condition that maximizes security and functionality. Even though distribution of software updates has improved, system administrators of enterprise networks are not able to easily maintain all computing devices in an enterprise network with the most recent software updates.

In light of the above-identified problems, it would be beneficial to have a system that distributes and installs software updates to all computing devices in an enterprise network. Desirably, an administrator would have control over the updates installed and could schedule installations of the software updates. The present invention is directed to providing such a system.

SUMMARY OF THE INVENTION

To address the above-described problems and other shortcomings in the prior art, the present invention provides a system and method of installing software updates to computing devices connected to an enterprise network. More specifically, the present invention provides a system and method of installing software updates based on input received from a system administrator or similar entity. When a command to install a software update is received, the present invention obtains the requested software update from a download center and causes the software update to be transmitted to computing devices connected to the enterprise network. Then the software update is installed in accordance with the input previously obtained from the system administrator.

One aspect of the present invention assists system administrators in identifying necessary software updates by performing "audits" of computing devices connected to the enterprise network. More specifically, the software state of client computing devices in an enterprise network is identified by scanning configuration databases stored on the client computing devices. When the client computing devices are being scanned, audit data is assembled and transmitted to a server computing device. From the audit data, an administrator may generate reports that provide statistics regarding the software state of client computing devices.

Another aspect of the present invention is a method that automatically installs software updates based on input received from a system administrator or similar entity. In this aspect, options are presented to a system administrator which allows the system administrator to (1) identify software updates that will be installed, (2) determine a time period when software updates will be installed, and (3) prioritize installation of software updates. After input from the system administrator is received, the requested software updates are obtained from a download center. Then the method causes the requested software updates to be installed in accordance with the options chosen by the system administrator.

In another aspect of the present invention, a computer system is provided that is configured to install software updates on computing devices connected to an enterprise network. The computer system includes a scan engine, a statistical analysis module, a graphical user interface, and a software distribution module. The scan engine is configured to identify the software state of computing devices connected to the enterprise network by performing a scan of configuration databases stored on the computing devices. Audit data produced by the scan engine is analyzed by the statistical analysis module and summarized in reports. From the reports, a system administrator or similar entity may easily identify software updates that need to be installed. The graphical user interface may be configured to accept a command to install a software update to one or more client computing devices. When a command is received, the software distribution module obtains the software update and causes the software update to be installed on one or more client computing devices.

In yet another aspect of the present invention, a computer-readable medium may be provided with contents that cause a computing system to operate in accordance with the methods described herein.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The present invention provides a system and method of installing software updates to computing devices connected to an enterprise network. More specifically, the present invention provides a system and method of installing software updates based on input received from a system administrator or similar entity. When a command to install a software update is received, the present invention obtains the requested software update from a download center and causes the software update to be transmitted to client computing devices that need the functionality provided by the software update. Then the software update is installed in accordance with the input previously obtained from the system administrator.

Although the present invention will primarily be described in the context of an enterprise network, those skilled in the relevant art and others will appreciate that the present invention is also applicable in other areas of computer networking and software engineering. The following description first provides an overview of a system in which the present invention may be implemented. Then methods for generating reports and installing software updates on client computing devices connected to an enterprise network are described. The illustrative examples provided herein are not intended to be exhaustive or to limit the invention to the precise forms disclosed. Similarly, any steps described herein may be interchangeable with other steps, or combinations of steps, in order to achieve the same result.

Figure 1:
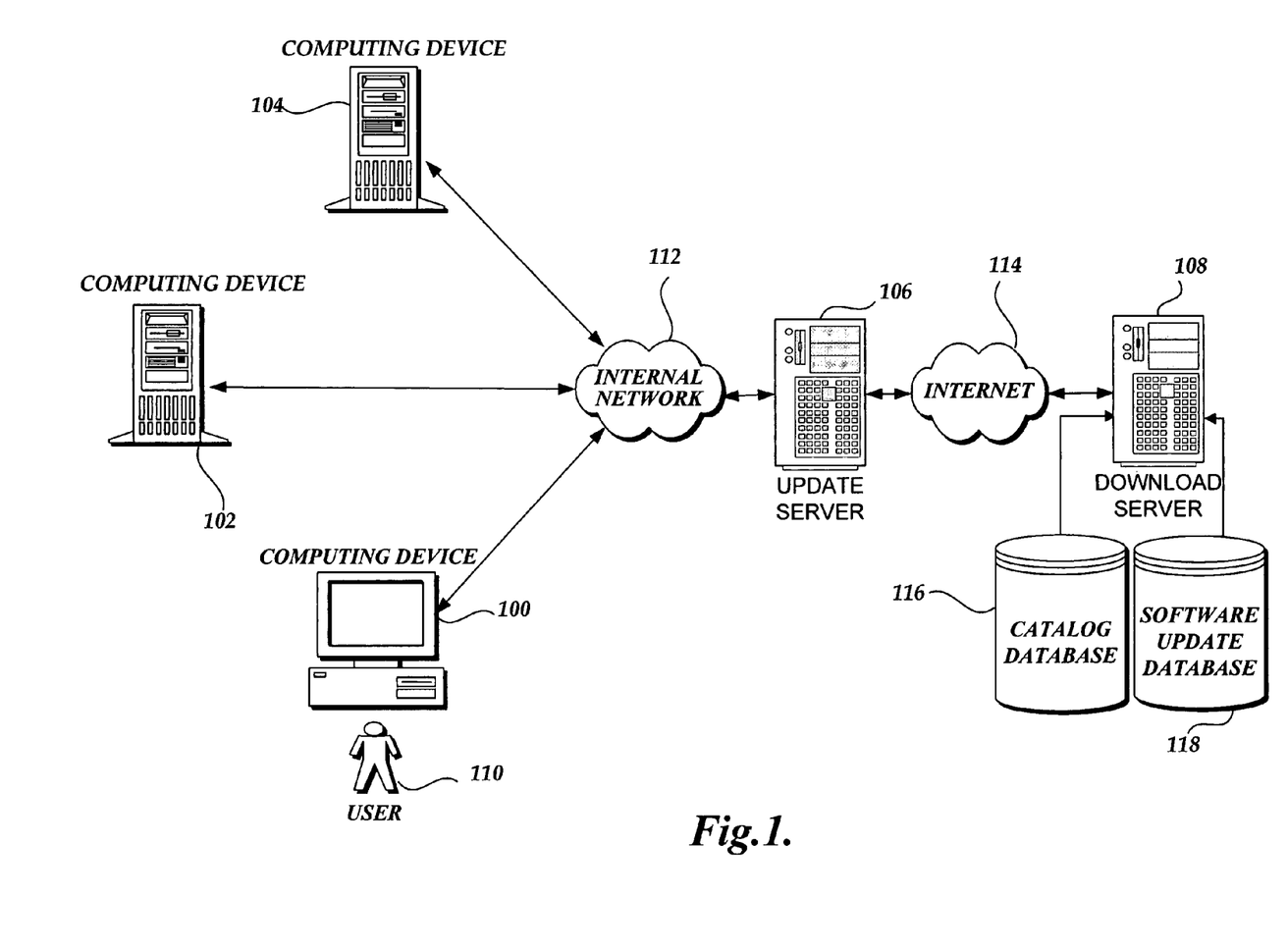
FIG. 1 is a pictorial depiction of an exemplary network environment in which embodiments of the present invention may be implemented.

Referring to FIG. 1, the following is intended to provide an exemplary overview of one suitable computer environment in which the present invention may be implemented. The illustrated environment comprises a plurality of client computing devices 100, 102, and 104, an update server 106, and a download server 108. The client computing device 100 is shown associated with user 110. The update server 106 is communicatively connected with the client computing devices 100, 102, and 104 and the download server 108. Also, the update server 106 is configured to communicate with the client computing devices 100, 102, and 104 via an internal network 112 that may be implemented as a local area network ("LAN"), wide area network ("WAN") or even a direct communication link. Conversely, the update server 106 is configured to communicate with the download server 108 over the Internet 114. As known to those skilled in the art and others, the computing devices illustrated in FIG. 1 may be configured to exchange documents, commands, and other types of data.

As illustrated in FIG. 1, the download server 108 is associated with a catalog database 116 and a software update database 118. As described in further detail below, software formed in accordance with the present invention (1) assists system administrators in identifying necessary software updates, and (2) installs software updates on client computing devices. The catalog database 116 includes a listing of software updates that are available from the software update database 118. Also, the catalog database 116 may include rules, typically in the form of Boolean logic, which prescribe the conditions under which individual software updates should be installed. In one embodiment of the present invention, the catalog database 116 may be configured as an XML document. When a system administrator identifies software updates that will be installed, the program code that implements the software updates is obtained from the software update database 118. Both the catalog database 116 and software update database 118 may be maintained on the download server 108 by a trusted software source, such as Microsoft Corporation.

Figure 2:
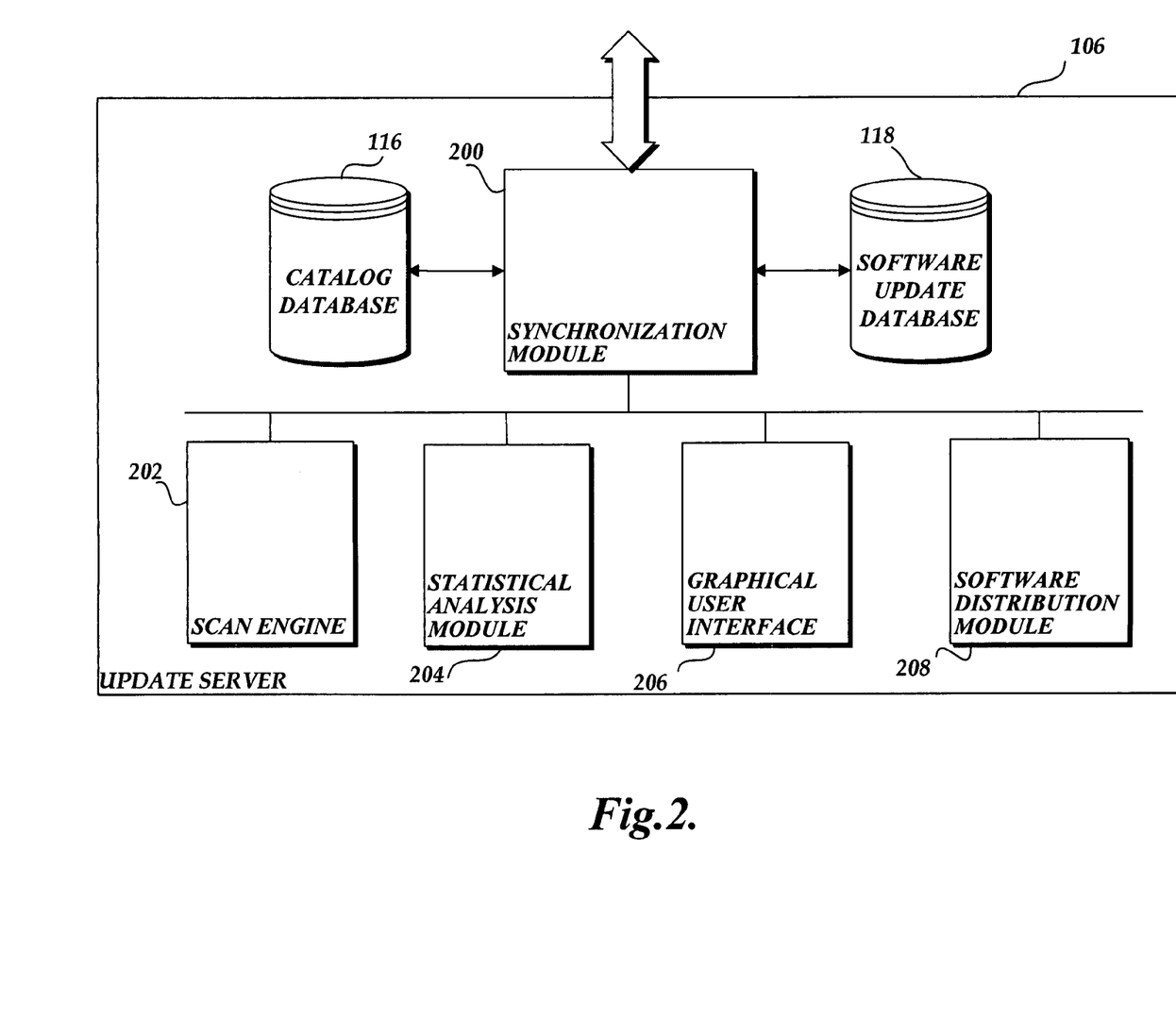
FIG. 2 is a block diagram of the update server depicted in FIG. 1 that is suitable to illustrate embodiments of the present invention.

Now, with reference to FIG. 2, components of the update server 106 shown in FIG. 1 will be described. In general, the update server 106 acts as a distribution point for software updates that are initially made available from the download server 108. Also, the update server 106 allows a system administrator to customize how software updates will be installed on client computing devices in an enterprise network. For example, the update server 106 may be configured to perform installations at predetermined periods of time, thereby minimizing inconvenience to users. Similarly, some types of software updates may be assigned a higher priority than other software updates. For example, software updates to antivirus software may be assigned a high priority level. In this instance, when a software update for antivirus software becomes available, the update server 106 may suspend installation of a lower priority software update until installation of the higher priority software update is complete. As illustrated in FIG. 2 and described in further detail below, the update server 106 includes a synchronization module 200, a scan engine 202, a statistical analysis module 204, a graphical user interface 206, and a software distribution module 208. Also, the catalog database 116 and software update database 118 may be replicated on the update server 106 by the synchronization module 200.

The synchronization module 200 is configured to download a copy of the catalog database 116 and the software update database 118 from the download server 108 (FIG. 1). Since a software update provider may regularly alter or add entries to the catalog database 116 and the software update database 118, the synchronization module 200 may be configured to check the download server 106 at regular intervals for changes. Each time the databases 116 and 118 are changed by the software update provider, the synchronization module 200 downloads the changes to the update server 106.

The scan engine 202 is configured to identify the software state of client computing devices by performing an analysis of configuration databases stored on those computing devices. As known to those skilled in the art and others, modern computing devices maintain databases from which configuration information may be obtained. For example, the system registry is a database used to store settings, options, and preferences regarding the operation of a computing device, including settings for all the hardware, software, and user preferences. The system registry also stores references to libraries, such as dynamically linked libraries, which identify the code segments and data used by application programs installed on the computing device. The scan engine 202 analyzes the system registry and other configuration databases to identify the operating system, application programs, and previously installed software updates installed on a client computing device. Then the scan engine 202 queries the catalog database 116 for information about available software updates and rules that govern when a particular software update should be installed. The output produced by the scan engine 202 is audit data which describes the software state of a client computing device including software updates that need to be installed on the client computing device.

In one embodiment of the present invention, a module for producing audit data is located on a client computing device such as client computing device 100 (FIG. 1). In this embodiment, the update server 106 obtains audit data by interfacing with a previously developed client-based program module located on the client computing device 100. The module maintains an application programming interface ("API") that defines the services available to other program modules. In this instance, the update server 106 is able to obtain audit data and other information from the client computing device 100 by making API calls. One commercially available software application that has a client-based program module capable of satisfying API calls for audit data is Windows® Update Services. When audit data is available to the update server 106 through a set of APIs, performance of the present invention in installing software updates is improved. For example, a scan for software installed on the client computing device may be performed by the client-based program module at regular intervals. The results of the scan are readily available to the update server 106 without requiring the update server 106 to perform an additional scan.

The statistical analysis module 204 is configured to obtain audit data for each client computing device. In one embodiment of the present invention, audit data is aggregated into reports to assist system administrators in identifying software updates that are needed throughout an enterprise network. As known to those skilled in the art and others, an enterprise network may consist of a large number of computing devices. To assist system administrators in identifying vulnerabilities in the enterprise network, the statistical analysis module 204 produces reports that describe the software state of a plurality of client computing devices. By viewing the reports, a system administrator may gain an understanding of which software updates need to be installed.

The reports generated by the statistical analysis module 204 may assist system administrators in numerous contexts of which the following are only examples. For instance, a system administrator may want to know which client computing devices have a specific software update installed. Reports may be generated that allow system administrators to identify client computing devices that have the software update installed. Also, after installation of a software update has been initiated, reports may be generated that identify client computing devices that were successfully updated as well as client computing devices that are yet to install the software update.

The update server 106 also maintains a graphical user interface ("GUI") 206 for communicating with a user, such as a system administrator. As known to those skilled in the art and others, a GUI is an input system characterized by the use of graphics on a computer display to communicate with a computer user. For example, reports generated by the statistical analysis module 204 may be displayed on the GUI 206. Also, the GUI 206 allows a system administrator to click buttons, icons, and menu options to generate commands. As described in further detail below with reference to FIGS. 3 through 8, the types of commands accepted by the GUI 206 include commands for generating different kinds of reports and for installing software updates.

The update server 106 also maintains a software distribution module 208 configured to transmit software updates from the download server 108 to the client computing devices where the software updates will be installed. To transmit the software updates, the software distribution module 208 uses network protocols generally known in the art such as File Transfer Protocol ("FTP"). When the software updates are located on the client computing devices, the software distribution module 208 then causes the updates to be installed.

As illustrated in FIG. 2, each component of the update server 106, e.g., the synchronization module 200, scan engine 202, statistical analysis module 204, GUI 206, software distribution module 208, catalog database 116, and software update database 118, are interconnected and able to communicate with other components. As known to those skilled in the art, FIG. 2 is a simplified example of one computing device capable of performing the functions of the present invention. Actual embodiments of the update server 106 will have additional components not illustrated in FIG. 2 or described in the accompanying text. Also, FIG. 2 shows one component architecture for installing software updates using an update server 106, but other component architectures are possible. Thus, FIG. 2 should be construed as exemplary and not limiting.

Figure 3:
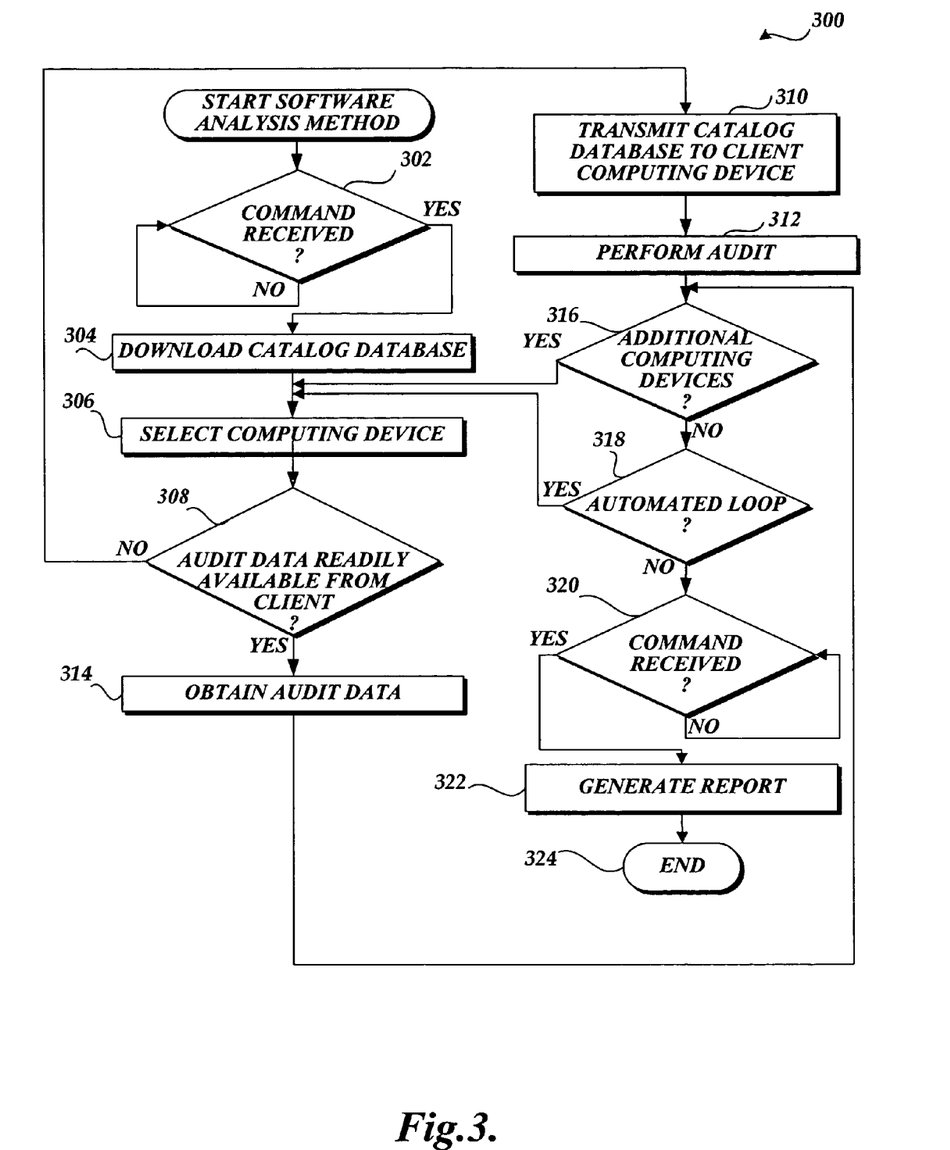
FIG. 3 is a flow diagram that illustrates a statistical analysis method that summarizes audit data into reports in accordance with one aspect of the present invention.

FIG. 3 is a flow diagram illustrating one exemplary embodiment of a software analysis method 300 formed in accordance with the present invention. In this embodiment, the software analysis method 300 analyzes configuration databases and produces audit data that describes the software state of a client computing device. The audit data may be used to create reports that provide an easy and efficient way to convey information about the software state of a plurality of computing devices to a system administrator. With continuing reference to FIGS. 1 and 2 and the accompanying descriptions, the software analysis method 300 illustrated in FIG. 3 will now be described.

The software analysis method 300 begins at block 302 where a command is obtained from a user, such as a system administrator, to perform an audit of one or more computing devices connected to an enterprise network. In one embodiment of the present invention, a system administrator manually issues a command to perform an audit. For example, a system administrator may determine that some client computing devices in an enterprise network are susceptible to a newly discovered and malicious computer program. In this instance, a system administrator may issue a command to immediately perform an audit of one or more client computing devices to determine whether a software update designed to "disinfect" these client computing devices is installed. In another embodiment, the command issued by a system administrator specifies a predetermined time period when an audit may be performed. For example, a system administrator may issue a command that causes an audit to be performed on every client computing device in an enterprise network at regular intervals (i.e., hourly, daily, weekly, monthly, etc.). In either instance, a command is accepted at block 302 using the GUI 206 that provides graphical elements for generating commands.

At block 304, the most recent version of the catalog database 116 is downloaded from a download center, such as download server 100, to a distribution point, such as update server 106. The data downloaded may be the entire catalog database 116 or merely changes made to the database 116 since the previous download. By downloading the catalog database 116 to the update server 106, the method 300 insures that the most recent information regarding available software updates is known. In accordance with an alternative embodiment of the present invention, the updates made to the catalog database 116 are downloaded at regular intervals (i.e., hourly, daily, weekly, monthly, etc.). In either instance, a recent version of the catalog database 116 is available on the update server 106 so that necessary software updates may be identified.

At block 306, the software analysis method 300 selects a client computing device from which audit data will be obtained in response to the command received at block 302. One aspect of the present invention allows a system administrator to identify the client computing devices from which audit data will be obtained. For example, a system administrator may issue a command for audit data to be obtained from computing devices in a specified geographic region. Alternatively, a system administrator may issue a command for a "blanket" audit to be performed on all client computing devices in an enterprise network. As described in further detail below, audit data may be presented to a system administrator in reports that summarize the software state of a plurality of client computing devices.

At decision block 308, the software analysis method 300 determines if a program module for producing audit data and other configuration information is installed on the selected client computing device. As described previously, some client computing devices may have a program module installed that maintains an interface, such as a set of APIs for providing services to other program modules. For example, a client-based program module included with Windows® Update Services is designed to scan configuration databases stored on a client computing device and produce audit data that is accessible through a set of APIs. At block 308, the software analysis method 300 determines whether audit data is available from the selected client computing device through an interface such as a set of APIs. In instances where audit data is accessible through an interface, the software analysis method 300 proceeds to block 314. Alternatively, when audit data is not accessible through an interface, the software analysis method 300 proceeds to block 310.

At block 310, the catalog database 116 is transmitted to the selected client computing device in preparation for the audit. If block 310 is reached, the selected client computing devices does not have a program module installed from which audit data may be obtained. Instead, a server-based computing device, such as the update server 106 (FIG. 2), will perform an audit of the selected computing device. In order to perform the audit, the catalog database 116 is transmitted to the selected client computing device in preparation for the audit. The speed of the present invention is improved if a resident version of the catalog database 116 is stored on all client computing devices in an enterprise network. If the selected client computing device was not audited previously, all of the data in the catalog database 116 is transmitted at block 310. Alternatively, if the selected client computing device was audited previously, the version of the catalog database 116 on the selected client computing device is updated with changes that occurred to the database 116 on the download server 108 since the previous audit.

At block 312, an audit is performed on the selected client computing device. The scan engine 202 is configured to identify the operating system, application programs, and software updates already installed on the selected client computing device. For example, as known to those skilled in the art and others, a system registry is a database used to store settings, options, and preferences regarding the operation of a computing device, including settings for all the hardware, software, and user preferences. An application program may not be functional unless certain information about the application program is contained in the system registry. The scan engine 202 is configured to parse configuration databases like the system registry and identify the exact version of the operating system, application programs, and software updates already installed on the selected client computing device. As known to those skilled in the art and others, a system registry is one illustrative example of a database used to store settings regarding the software state of a computing device.

The catalog database 116 downloaded to the selected client computing device at block 310 provides information regarding the relationship between software potentially present on the computing device and available software updates. After the software state of the selected client computing device is known, the scan engine 202 is configured to determine the software updates that need to be installed on the selected client computing device. Then the scan engine 202 assembles the data known about the selected client computing device and transmits the data to the update server 106.

At block 314, the software analysis method 300 obtains audit data from the selected client computing device. If block 314 is reached, the selected client computing device has a program module installed that maintains an interface for providing services to other program modules. More specifically, the selected client computing device maintains a set of APIs that may be used to identify the software updates that are not installed on the computing device. In this instance, the program module maintains a resident copy of the catalog database 116 that is updated at regular intervals when the program module performs a scan of the selected client computing device. Since a client-based program module is responsible for generating audit data, the software analysis method 400 is able to identify the updates that need to be installed by making one or more API calls.

At decision block 316, the software analysis method 300 determines if any additional client computing devices will be selected. As described previously, the command received at block 302 may require the software analysis method 300 to obtain audit data from one or more client computing devices. If additional client computing devices need to be selected, the software analysis method 300 proceeds to block 318 discussed below. Conversely, if additional client computing devices will be selected, the method 300 proceeds back to block 306 and blocks 306 through 314 repeat until all of the necessary client computing devices have been selected.

At block 318, the software analysis method 300 determines if audits of client computing devices will be conducted in a continuous loop. The catalog database 116 may be updated at any time by a software update provider. For example, a new malicious computer program may be released on computer networks that require an immediate software update. The present invention may be configured to perform audits in a continuous loop so that when a new software update becomes available, client computing devices in an enterprise network may begin installing the software update immediately.

At block 320, the software analysis method 300 remains idle and waits for a command from a system administrator to generate a report. As described previously, a report summarizes the software state of one or more client computing devices in an enterprise network. In one embodiment of the present invention, the system administrator generates commands using tools (i.e., buttons, icons, menus, etc.) available from the graphical user interface 206. As known to those skilled in the art and others, graphical user interfaces are event driven systems. Thus, a system administrator may issue a command to generate a report at any time audit data is available on the update server 106.

At block 322, a report that is responsive to the command received at block 320 is generated by the statistical analysis module 204. At block 320, different types of commands that assist system administrators in identifying necessary software updates may be generated. Stated differently, a system administrator may gain an understanding of the vulnerabilities facing an enterprise network by causing one of many different types of reports to be generated. When a command is received, audit data that describes the software state of one or more client computing devices in an enterprise network is analyzed and summarized in a report. Then the statistical analysis method 300 proceeds to block 324 where it terminates.

The statistical analysis method 300 is designed to function with both a system where a client-based program module identifies necessary software updates and a system where a scan of client computing devices is performed by a server computing device. To accommodate these different systems, the statistical analysis method 300 may include additional or fewer steps than described above. In instances where a client-based program module identifies necessary software updates, certain data may be obtained by the method 300 in an additional step. For example, a client-based program module is able to obtain data regarding the reasons why an installation failure occurred. This type of data may be obtained by the statistical analysis method 300 in an additional step and displayed to a system administrator in a report.

Figure 4:
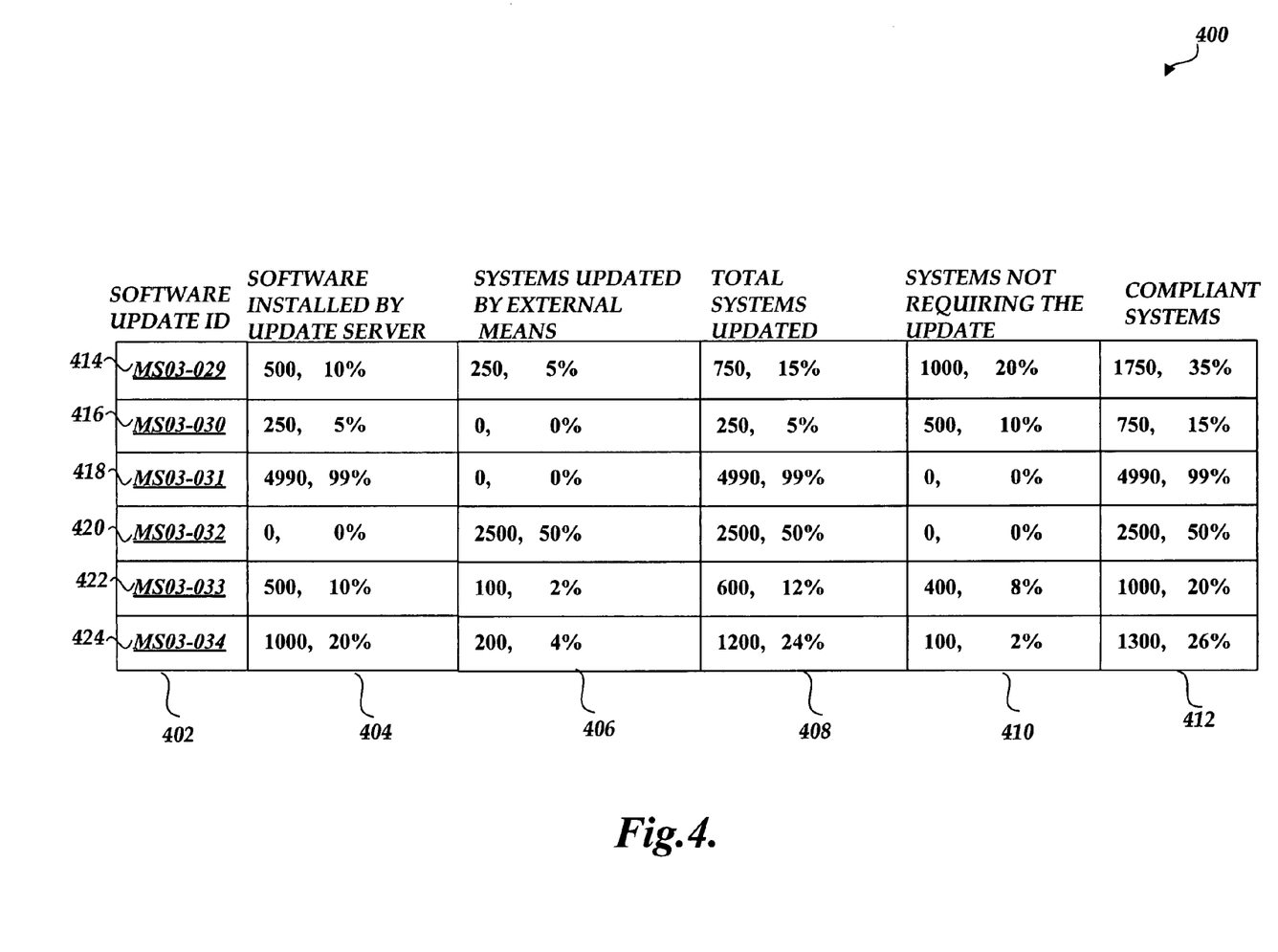
FIG. 4 is a pictorial depiction of a report suitable to display data in conjunction with the method depicted in FIG. 3.

For illustrative purposes and by way of example only, a representative report 400 is illustrated in FIG. 4. The report 400 consists of six columns, each of which contains multiple entries. The columns are identified as SOFTWARE UPDATE ID 402, SOFTWARE INSTALLED BY UPDATE SERVER 404, SYSTEMS UPDATED BY EXTERNAL MEANS 406, TOTAL SYSTEMS UPDATED 408, SYSTEMS NOT REQUIRING THE UPDATE 410, and COMPLIANT SYSTEMS 412. The SOFTWARE UPDATE ID 402 column contains a unique identifier for software updates that are available from a download center such as the download server 108. The SOFTWARE INSTALLED BY UPDATE SERVER 404 column identifies the number and percentage of client computing devices in an enterprise network that had the specified software update installed by the present invention. The SYSTEMS UPDATED BY EXTERNAL MEANS 406 column identifies the number and percentage of client computing devices in an enterprise network that had the specified software update installed using a system other than the present invention. As known to those skilled in the art and others, existing systems allow users to obtain and install software updates. For example, a user may manually download a software update and cause an installation program to be executed. The number and percentage of client computing devices that use a system other than the present invention to install the specified software update is identified in column 406. The TOTAL SYSTEMS UPDATED 408 column identifies the number and percentage of client computing devices in an enterprise network that had a specified software update installed, regardless of the mechanism used. The SYSTEMS NOT REQUIRING THE UPDATE 410 column identifies the number and percentage of client computing devices in an enterprise network that do not need the specified software update installed. Lastly, the COMPLIANT SYSTEMS 412 column identifies the number and percentage of client computing devices in an enterprise network that do not need the specified software update installed, either because the software update was already installed or because the software update is not needed. Aggregating audit data in the report 400 provides an easy way for system administrators to identify vulnerabilities in an enterprise network. Also, reports may provide a mechanism for system administrators to obtain more specific information regarding a software update. For example, the report 400 illustrated in FIG. 4 contains links 414, 416, 418, 420, 422, and 424. As described in further detail below with regard to FIG. 5, when a link is activated, additional information about the specified software update may be obtained. Although FIG. 4 illustrates one report 400 having specific attributes, those skilled in the art will appreciate that the present invention may operate with more or fewer than all of the listed attributes.

Figure 5:
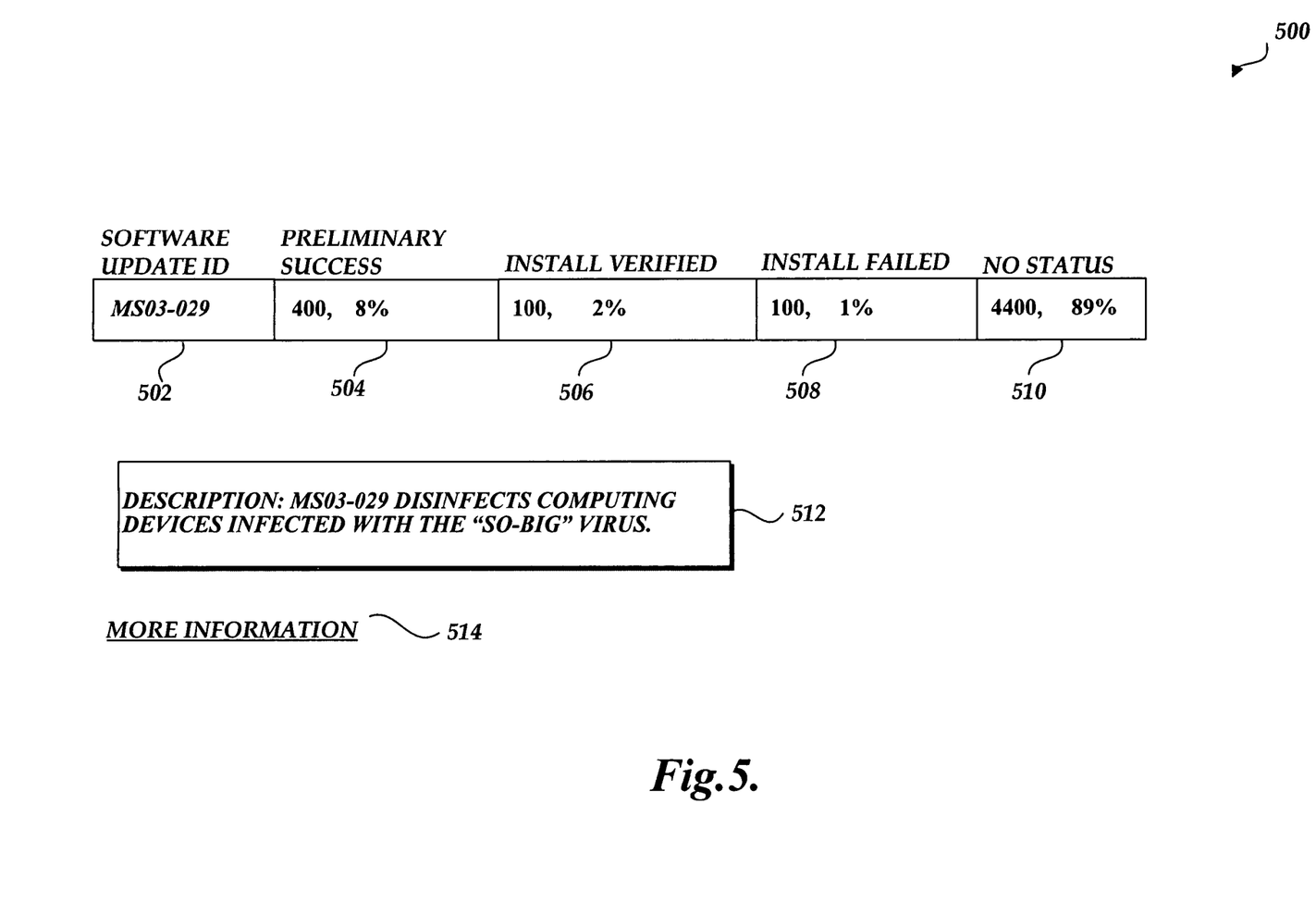
FIG. 5 is a pictorial depiction of a report suitable to display data in conjunction with the method depicted in FIG. 3.

For illustrative purposes and by way of example only, another representative report 500 is depicted in FIG. 5. The report 500 depicted includes exemplary data that may be displayed after a system administrator activates the "MS03-029" link 414 shown in FIG. 4. When a link is activated, a command is sent to the download server 108 requesting additional information about a software update. More specifically, the report 500 in FIG. 5 consists of five columns that collectively provide information about the state of the specified software update. The columns are identified as SOFTWARE UPDATE ID 502, PRELIMINARY SUCCESS 504, INSTALL VERIFIED 506, INSTALL FAILED 508, and NO STATUS 510. Similar to FIG. 4, the SOFTWARE UPDATE ID 502 column contains a unique identifier assigned to a software update. The PRELIMINARY SUCCESS 504 column displays the number and percentage of client computing devices in which the software update installed without any known errors. The INSTALL VERIFIED 506 column displays the number and percentage of client computing devices in which installation was verified with an audit. Similarly, the INSTALL FAILED 508 column identifies the number and percentage of client computing devices in which an installation failure was verified with an audit. Lastly, the NO STATUS 510 column identifies the number and percentage of client computing devices in which information about the specified software update is not known. This may occur, for example, if an audit of one or more client computing devices in an enterprise network has not been performed.

In instances when a program module is installed on a client computing device that is capable of producing audit data, the present invention may be used to provide the status of an installation. As described above, a program module may be installed on a client computing device that provides a set of APIs. In one embodiment of the present invention, the client-based program module is able to obtain messages regarding the status of an installation. When status messages are accessible, those messages may be displayed to a system administrator using the type of report 500.

By way of example only, the report 500 contains a brief description 512 of the functionality provided by the selected software update. Also, as illustrated in FIG. 5, the report 500 may be configured with embedded controls, such as a "more information" button 512 that allows a system administrator to obtain additional information about the specified software update. When the button 512 is activated, a signal is sent to the download server 108 where a hypertext document that contains additional descriptive text regarding the specified software update is obtained.

Figure 6:
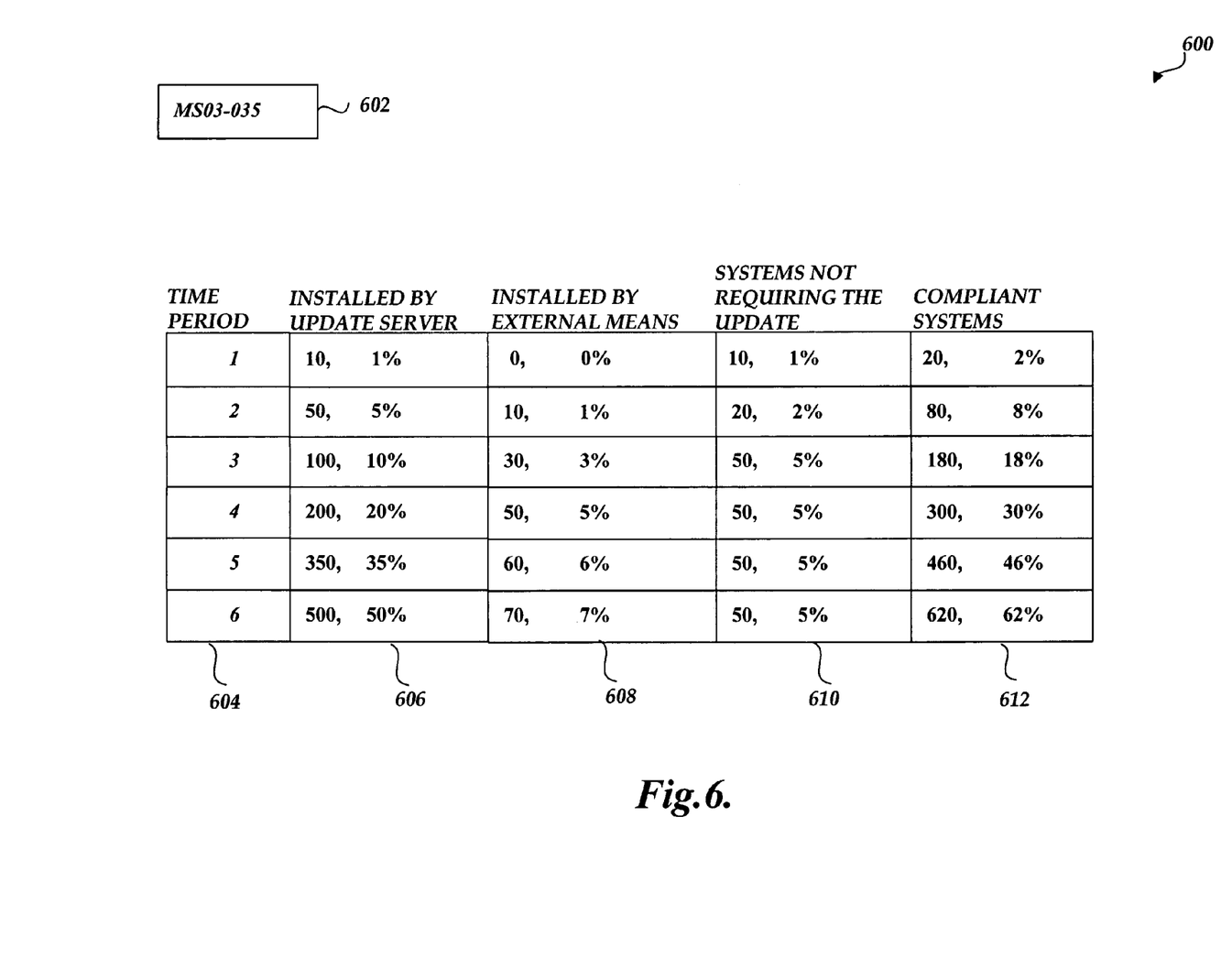
FIG. 6 is a pictorial depiction of a report suitable to display data in conjunction with the method depicted in FIG. 3.

For illustrative purposes and by way of example only, another representative report 600 is depicted in FIG. 6. Similar to FIGS. 4 and 5, the report 600 contains a unique identifier 602 that identifies a specified software update. Also, the report 600 depicted in FIG. 6 consists of five columns that collectively provide information about the installation of a software update over time. The columns are identified as TIME PERIOD 604, INSTALLED BY UPDATE SERVER 606, INSTALLED BY EXTERNAL MEANS 608, SYSTEMS NOT REQUIRING THE UPDATE 610, and COMPLIANT SYSTEMS 612. The TIME PERIOD 604 column contains a time when client computing devices in an enterprise network were scanned to determine if a software update was installed. The time interval between entries in the TIME PERIOD 604 column may be set to any value (such as hourly, daily, monthly, etc.). The INSTALLED BY UPDATE SERVER 606 column identifies the number and percentage of client computing devices in an enterprise network that have the specified software update installed at the given time. The SYSTEMS UPDATED BY EXTERNAL MEANS 608 column identifies the number and percentage of client computing devices that have the specified software update installed using a system other than the present invention at the given time. The SYSTEMS NOT REQUIRING THE UPDATE 610 column identifies the number and percentage of client computing devices that do not need the specified software update installed. Lastly, the COMPLIANT SYSTEMS 612 column identifies the number and percentage of client computing devices that no longer need the functionality provided by the specified software update. Aggregating audit data in the report 600 provides an easy way for system administrators to track the installation of software updates over time.

Figure 7:
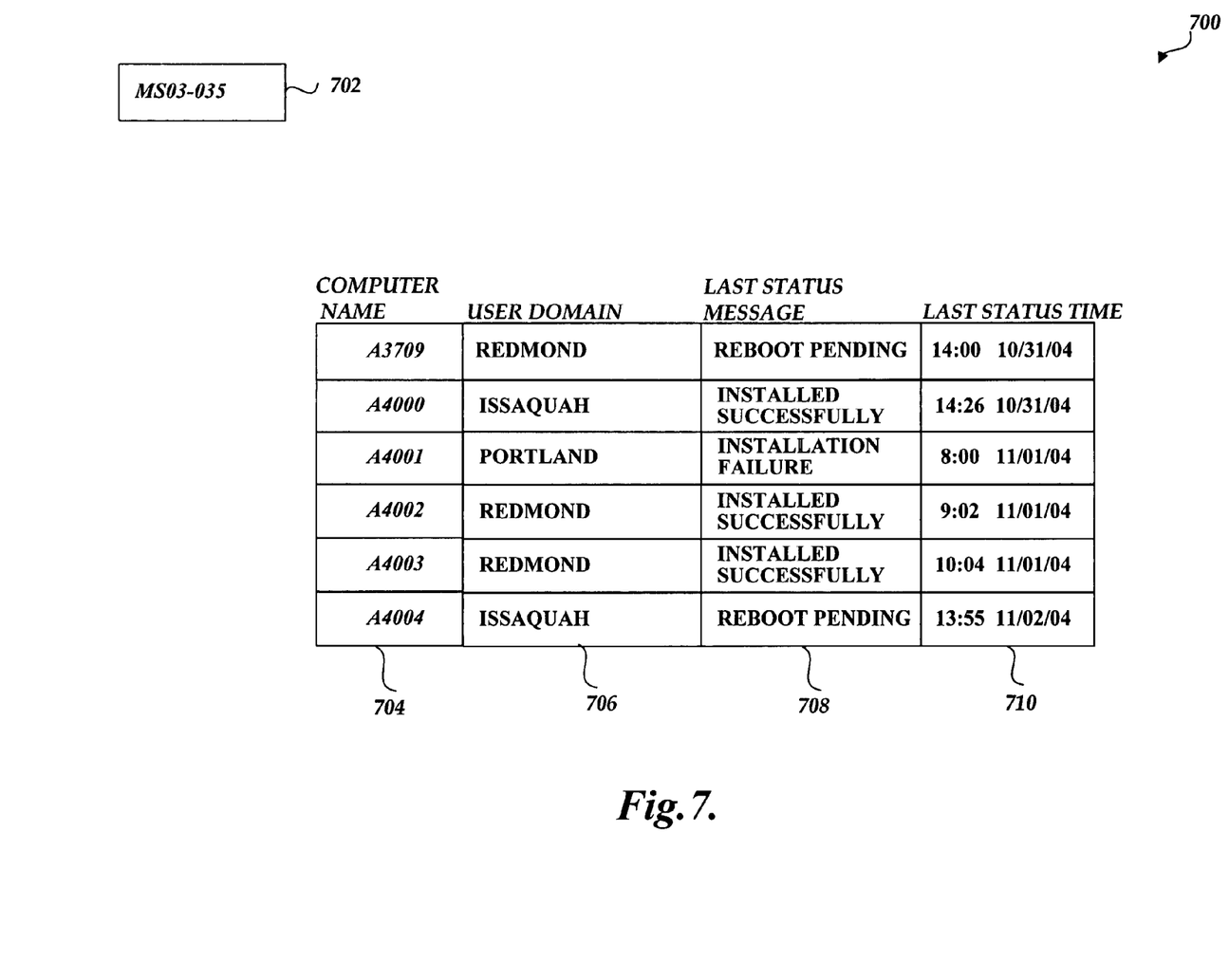
FIG. 7 is a pictorial depiction of a report suitable to display data in conjunction with the method depicted in FIG. 3.

For illustrative purposes and by way of example only, another representative report 700 is depicted in FIG. 7. Similar to FIGS. 4-6, the report 700 contains a unique identifier 702 used to reference a software update. Also, the report 700 depicted in FIG. 7 consists of four columns identified as COMPUTER NAME 704, USER DOMAIN 706, LAST STATUS MESSAGE 708, and LAST STATUS TIME 710. The COMPUTER NAME 704 column contains a string-based name used to identify a computing device in an enterprise network. The USER DOMAIN 706 column identifies a logical division of an enterprise network to which a specified computing device belongs. As known to those skilled in the art and others, large enterprise networks are typically divided into logical divisions. For example, since an enterprise network may be dispersed geographically, a logical division may be based on the location of a computing device. The LAST STATUS MESSAGE 708 column identifies the last status message received from a computing device with regard to a software update. As known to those skilled in the art and others, when an attempt to install a software is made, a client computing device may be configured to produce "status" messages. For example, a status message may indicate that a software update either did or did not install successfully. Also, a status message may indicate that installation of a software update is pending until a "reboot" occurs. Lastly, the LAST STATUS TIME 612 field contains a time when the most recent status message was obtained. The report 700 illustrated in FIG. 7 assists system administrators in identifying the state of software updates. For example, by viewing a report of the type illustrated in FIG. 7, a system administrator may learn that all computing devices in a particular domain failed to install a software update. In this instance, the system administrator may begin "troubleshooting" the software installation failure with information contained in the report 700.

As will be appreciated by those skilled in the art and others, FIGS. 4-7 are highly simplified examples of reports that illustrate certain aspects of the present invention. Additional reports may be generated that allow a system administrator to obtain data that is not described above. For example, reports may be generated that allow system administrators to "drill down" and obtain information about the software state of any client computing device in an enterprise network.

Figure 8:
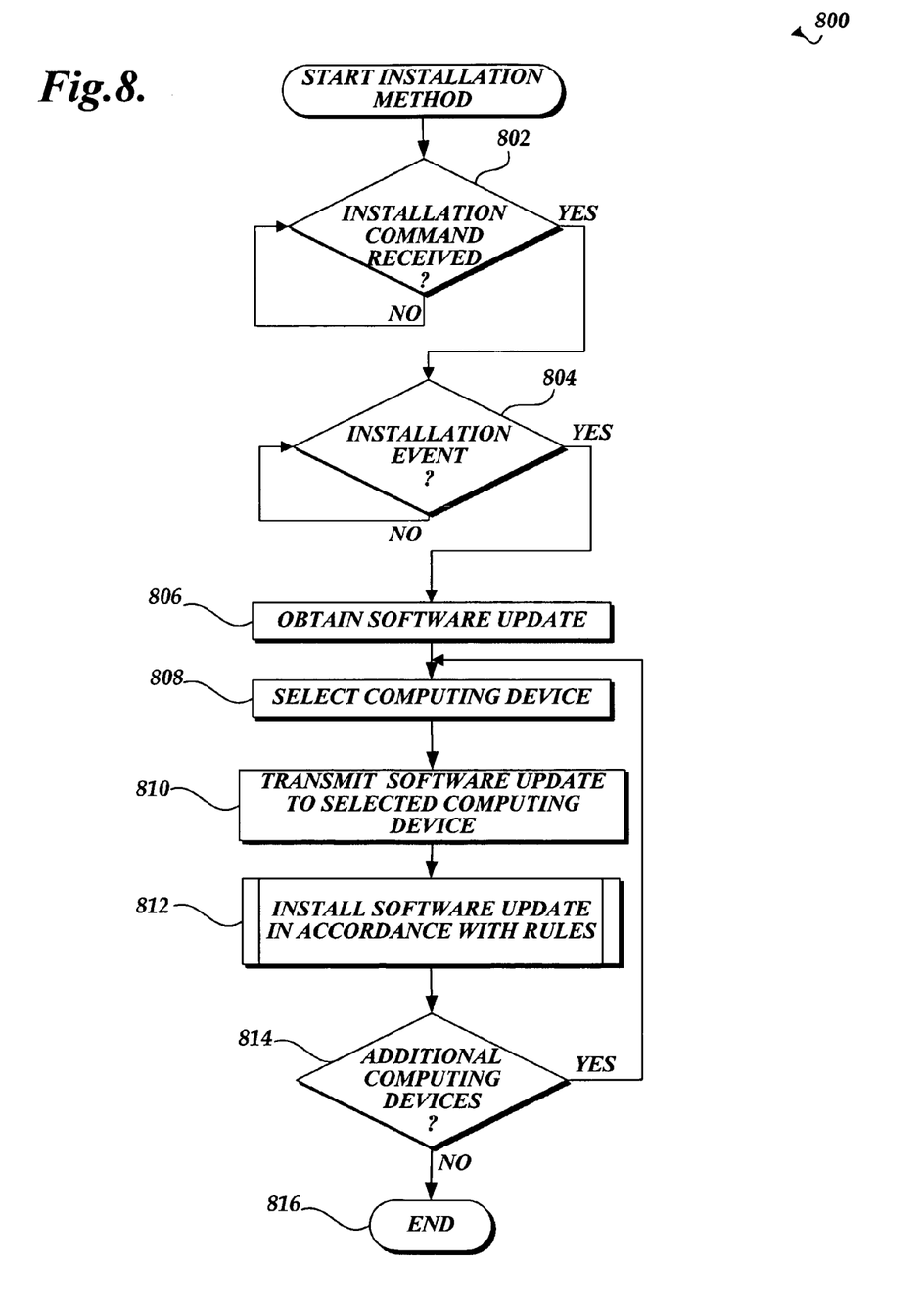
FIG. 8 is a flow diagram that illustrates an installation method that causes a software update to be installed on one or more computing devices in accordance with one aspect of the present invention.

FIG. 8 is a flow diagram illustrating one exemplary embodiment of an installation method 800 formed in accordance with the present invention. In summary, the installation method 800 allows a system administrator or similar entity to issue commands to install a specified software update in accordance with a set of rules. After a command to install one or more software updates is received, the requested software updates are obtained from a download center such as the download server 108. Then the installation method 800 causes the requested software updates to be installed in accordance with rules specified by the system administrator. With continuing reference to FIGS. 1-7 and the accompanying descriptions, the installation method 800 illustrated in FIG. 8 will now be described.

The installation method 800 begins at block 802 where a command is received from a system administrator to install one or more software updates. In this respect, command data is received that (1) provides a time period when the software updates will be installed, and (2) assigns priority levels to the software updates. The command data is obtained using the GUI 206 that presents easily understood graphical elements for generating commands.

When software formed in accordance with the invention is implemented in a computing device, such as update server 106, the computing device provides a way to install software updates to client computing devices communicatively connected to the update server 106. The software updates are installed in accordance with the command received at block 802. For example, a system administrator may generate a command to immediately install a software update to every computing device in an enterprise network. A software update may be assigned a priority level so that other installations with a lower priority level are suspended until installation of the higher priority software update is complete. In another example of an application of the present invention, a system administrator may generate a command for a software update to be installed during a time period when computing devices are likely to be idle. Since updating large numbers of computing devices may be time consuming, the system administrator may designate a reoccurring time period for installations to occur (i.e., daily from 12:00 a.m. to 2:00 a.m.).

At decision block 804 the installation method 800 remains idle and waits for an installation event. As described previously, installations may be scheduled to begin at any time. When the time period for a software update to be installed arrives, the installation method 800 causes a software update to be installed.

At block 806 the software update that will be installed is downloaded from a download center, such as the download server 108, to a distribution point, such as the update server 106. The software update may be downloaded to the update server 106 just prior to installation. Alternatively, software updates may be downloaded at regular intervals (i.e., hourly, daily, weekly, monthly, etc.). In either instance, at block 806 the software update that will be installed is obtained by the method 800.

At block 808, the installation method 800 selects a client computing device in the enterprise network. For each client computing device selected, the installation method 800 causes the software update to be transmitted to the selected client computing device and installed in accordance with the command received at block 802.

At block 810, the executable code required to install the software update is transmitted from a distribution point (i.e., update server 106) to the selected client computing device.

Since transmitting data over a network may utilize any one of a number of different communication protocols generally known in the art, further description of these protocols is not provided here.

At block 812, the software update is installed on the selected client computing device in accordance with the command generated by the system administrator at block 802. However, prior to installing the software update, the scan engine 200 performs an audit of the selected client computing device to determine if the software update still applies. Stated differently, software updates may be installed using a system other than the present invention. In this instance, the installation method 800 prevents duplicative installations by performing another scan of the selected client computing device. If the audit data indicates that the software update has not already been installed, then the software update is installed. After the installation is complete, the scan engine 200 again evaluates the configuration databases on the selected client computing device to determine if installation of the software update completed successfully.

During the installation process at block 812, a previously realized software system may present a user of the selected client computing device with options for installing the software update. By way of example only, one option available to a user is to delay installation of the software update until a later time. A detailed description of a system and method of presenting a user with various options for installing a software update may be found in commonly assigned Application No. 60/455,197, titled "SOFTWARE UPDATING SYSTEM AND METHOD", filed Mar. 17, 2003, the content of which is expressly incorporated herein by reference.

At decision block 814, the software analysis method 800 determines if any additional client computing devices will be selected. As described previously, the command received at block 802 may require the installation method 800 to install a software update on more than one client computing device. If additional client computing devices do not need to be selected, the installation method 800 proceeds to block 816 where it terminates. Conversely, if additional client computing devices will be selected, the method 800 proceeds back to block 808 and blocks 808 through 814 repeat until the software update has been installed on all of the requested client computing devices.

Implementations of the present invention are not limited to the installation 800 method shown in FIG. 8. As noted above, a system administrator may assign different priority levels to software updates. In this instance, a software update with a low priority level that is currently being installed may be suspended when a higher priority software update begins the installation process. Thus, the installation method 800, described above, may be suspended at any step to service a different software update. Also, other methods may eliminate steps or add steps to the installation method 800. For example, audits performed by the scan engine 202 may indicate that a plurality of software updates needs to be installed on one or more client computing devices in an enterprise network. In this instance, the installation method 800 may cause all of the necessary software updates to be installed. Thus, the embodiment of the present invention described above with reference to FIG. 8 should be construed as exemplary and not limiting.

The statistical analysis method 300 (FIG. 3) and the installation method 800 (FIG. 8) may be implemented in combination to fully automate the process of identifying and installing necessary software updates. For example, a system administrator may issue a command so that audits of client computing devices are performed in a continuous loop. When a new software update becomes available at a download center, such as download server 106, audit data generated by the scan engine 200 will indicate that the new software update needs to be installed. The installation method 800 may be configured to install the software update when audit data indicates that installation of the new software update is needed.

While an embodiment of the invention has been illustrated and described, it will be appreciated that various changes can be made therein without departing from the spirit and scope of the invention.

The embodiments of the invention in which an exclusive property or privilege is claimed are defined as follows:

1. In an enterprise network comprising a plurality of client computers that are maintained by a system administrator, a method for obtaining information about the software state of the plurality of client computers which is used to determine updates to install on the plurality of client computers comprising:

receiving a first command from the system administrator to perform an audit of one or more client computers of the enterprise network, wherein the audit generates audit data which describes the software state of each of the one or more client computers;

in response to the command, downloading a catalog database from a download server to an update server of the enterprise network, wherein the catalog database contains a listing of software updates that are available to be downloaded to the client computers and rules which prescribe the conditions under which individual software updates should be installed;

for each of the one or more client computers, determining whether a program module for producing audit data is installed on the client computer such that:
 if a program module for producing audit data is installed on the client computer, the audit data is obtained through an application programming interface of the program module; and
 if a program module for producing audit data is not installed, the audit data is obtained by performing the following steps:
  transmitting the catalog database to the client computer;
  scanning a configuration database of the client computer to identify the operating system, application programs, and software updates that have already been installed on the client computer; and
  comparing the listing of software updates from the catalog database to the identified operating system, application programs, and software updates to generate the audit data;

receiving a second command from the system administrator to generate a report that describes the combined software state of the one or more client computers;

generating the report, wherein the report lists:
 (1) the software updates that are available as listed in the catalog database, wherein each software update is identified by a unique identifier which is selectable to provide further information regarding the software update; and
 (2) for each available software update, an indication of the number and percentage of client computers on which the software update has been installed;

receiving a third command from the system administrator which selects one of the software updates in the report;

displaying the further information corresponding to the selected software update, wherein the further information includes a listing of the one or more client computers with an indication of whether the selected software update has been installed on each of the one or more client computers, and wherein the further information indicates that a first software update has not been installed on a first client computer;

receiving a fourth command from the system administrator that specifies that the first software update should be installed on the first client computer;

in response to the fourth command, downloading the first software update from the download server to the first client computer; and installing the first software update on the first client computer.

2. The method of claim 1, wherein downloading the first software update from the download server to the first client computer further comprises:

downloading the first software update from the download server to the update server that is part of the enterprise network; and downloading the first software update from the update server to the first client computer.

3. The method of claim 2, wherein the report further specifies the number and percentage of client computers on which the software update was installed from the update server of the enterprise network and the number and percentage of client computers on which the software update was installed by other means.

4. The method of claim 1, wherein the configuration database of the client computer that is scanned is the system registry.

5. The method of claim 1, wherein the fourth command includes instructions for installing the first software update, the instructions comprising a time and a priority to install the first software update.

6. The method of claim 5, wherein the priority is a low priority such that the installation of the first software is suspended when a second software update with a higher priority is scheduled to be installed at the same time as the first software update.

7. The method of claim 1, wherein transmitting the catalog database to the client computer further comprises:

transmitting updates to the catalog database when a version of the catalog database is already stored on the client computer.

8. The method of claim 1, wherein the report identifies that a second software update has not been installed on a majority of the one or more client computers of the enterprise network, and wherein the method further comprises:

receiving a fifth command from the system administrator specifying that the second software update is to be installed on each of the client computers on which the second software update has not previously been installed, wherein the fifth command includes instructions for installing the second software update, the instructions comprising a time and a priority to install the second software update such that the same instructions are applied when installing the second software update on each of the client computers on which the second software update has not previously been installed.

9. A computer storage media having stored computer executable instructions which when executed by a processor in an enterprise network comprising a plurality of client computers that are maintained by a system administrator perform a method for obtaining information about the software state of the plurality of client computers which is used to determine updates to install on the plurality of client computers comprising:

receiving a first command from the system administrator to perform an audit of one or more client computers of the enterprise network, wherein the audit generates audit data which describes the software state of each of the one or more client computers;

in response to the command, downloading a catalog database from a download server to an update server of the enterprise network, wherein the catalog database contains a listing of software updates that are available to be downloaded to the client computers and rules which prescribe the conditions under which individual software updates should be installed;

for each of the one or more client computers, determining whether a program module for producing audit data is installed on the client computer such that:

if a program module for producing audit data is installed on the client computer, the audit data is obtained through an application programming interface of the program module; and if a program module for producing audit data is not installed, the audit data is obtained by performing the following steps:

transmitting the catalog database to the client computer;

scanning a configuration database of the client computer to identify the operating system, application programs, and software updates that have already been installed on the client computer;

comparing the listing of software updates from the catalog database to the identified operating system, application programs, and software updates to generate the audit data;

receiving a second command from the system administrator to generate a report that describes the combined software state of the one or more client computers;

generating the report, wherein the report lists:

(1) the software updates that are available as listed in the catalog database, wherein each software update is identified by a unique identifier which is selectable to provide further information regarding the software update; and (2) for each available software update, an indication of the number and percentage of client computers on which the software update has been installed;

receiving a third command from the system administrator which selects one of the software updates in the report;

displaying the further information corresponding to the selected software update, wherein the further information includes a listing of the one or more client computers with an indication of whether the selected software update has been installed on each of the one or more client computers, and wherein the further information indicates that a first software update has not been installed on a first client computer;

receiving a fourth command from the system administrator that specifies that the first software update should be installed on the first client computer;

in response to the fourth command, downloading the first software update from the download server to the first client computer; and installing the first software update on the first client computer.

10. The computer storage media of claim 9, wherein downloading the first software update from the download server to the first client computer further comprises:

downloading the first software update from the download server to the update server that is part of the enterprise network; and downloading the first software update from the update server to the first client computer.

11. The computer storage media of claim 10, wherein the report further specifies the number and percentage of client computers on which the software update was installed from the update server of the enterprise network and the number and percentage of client computers on which the software update was installed by other means.

12. The computer storage media of claim 9, wherein the configuration database of the client computer that is scanned is the system registry.

13. The computer storage media of claim 9, wherein the fourth command includes instructions for installing the first software update, the instructions comprising a time and a priority to install the first software update.

14. The computer storage media of claim 13, wherein the priority is a low priority such that the installation of the first software is suspended when a second software update with a higher priority is scheduled to be installed at the same time as the first software update.

15. The computer storage media of claim 9, wherein transmitting the catalog database to the client computer further comprises:

transmitting updates to the catalog database when a version of the catalog database is already stored on the client computer.

16. The computer storage media of claim 9, wherein the report identifies that a second software update has not been installed on a majority of the one or more client computers of the enterprise network, and further comprising:

receiving a fifth command from the system administrator specifying that the second software update is to be installed on each of the client computers on which the second software update has not previously been installed, wherein the fifth command includes instructions for installing the second software update, the instructions comprising a time and a priority to install the second software update such that the same instructions are applied when installing the second software update on each of the client computers on which the second software update has not previously been installed.

* * * * *